(12) United States Patent
Peluso

(10) Patent No.: US 7,579,947 B2
(45) Date of Patent: Aug. 25, 2009

(54) INDUSTRIAL PROCESS SENSOR WITH SENSOR COATING DETECTION

(75) Inventor: Marcos A. V. Peluso, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 276 days.

(21) Appl. No.: 11/582,121

(22) Filed: Oct. 17, 2006

(65) Prior Publication Data

US 2007/0085670 A1    Apr. 19, 2007

Related U.S. Application Data

(60) Provisional application No. 60/728,201, filed on Oct. 19, 2005.

(51) Int. Cl.
G08B 1/08 (2006.01)

(52) U.S. Cl. ............ 340/539.26; 340/501; 340/514; 73/861.12; 73/861.15

(58) Field of Classification Search ............. 340/595, 340/514, 501, 539.26; 702/85, 104, 45; 73/861.23, 73/861.22, 861.12, 861.15, 597, 602
See application file for complete search history.

(56) References Cited

U.S. PATENT DOCUMENTS

| | | | |
|---|---|---|---|
| 4,859,076 A * | 8/1989 | Twerdochlib | 374/10 |
| 4,958,938 A | 9/1990 | Schwartz et al. | |
| 5,428,348 A * | 6/1995 | Gault | 340/618 |
| 5,523,743 A * | 6/1996 | Rattman et al. | 340/630 |
| 5,817,950 A | 10/1998 | Wiklund et al. | |
| 5,876,122 A | 3/1999 | Eryurek | |
| 6,014,902 A * | 1/2000 | Lewis et al. | 73/861.12 |
| 6,173,609 B1 * | 1/2001 | Modlin et al. | 73/293 |
| 6,182,019 B1 | 1/2001 | Wiklund | |
| 6,425,293 B1 * | 7/2002 | Woodroffe et al. | 73/756 |
| 6,473,710 B1 | 10/2002 | Eryurek | |
| 6,509,838 B1 | 1/2003 | Payne et al. | |
| 6,519,546 B1 | 2/2003 | Eryurek et al. | |
| 6,556,145 B1 | 4/2003 | Kirkpatrick et al. | |
| 6,601,005 B1 * | 7/2003 | Eryurek et al. | 702/104 |
| 6,754,601 B1 | 6/2004 | Eryurek et al. | |
| 7,265,832 B2 * | 9/2007 | Montgomery et al. | 356/338 |
| 7,290,450 B2 * | 11/2007 | Brown et al. | 73/579 |
| 2003/0209056 A1 * | 11/2003 | Dimarzo et al. | 73/25.01 |
| 2003/0233723 A1 * | 12/2003 | Lizotte et al. | 15/250.001 |
| 2003/0233860 A1 * | 12/2003 | Deane et al. | 73/1.16 |
| 2004/0016283 A1 * | 1/2004 | Wang et al. | 73/1.02 |
| 2004/0075578 A1 * | 4/2004 | Dudda et al. | 340/870.3 |
| 2005/0079833 A1 | 4/2005 | Bauschke et al. | |
| 2005/0080493 A1 | 4/2005 | Arntson | |
| 2005/0162178 A1 * | 7/2005 | Steele et al. | 324/755 |
| 2005/0194264 A1 | 9/2005 | Dalmia | |
| 2005/0288799 A1 | 12/2005 | Brewer et al. | |
| 2006/0015292 A1 | 1/2006 | Lubcke | |

* cited by examiner

Primary Examiner—Davetta W Goins
Assistant Examiner—Hoi C Lau
(74) Attorney, Agent, or Firm—Kinney & Lange, P.A.

(57) ABSTRACT

An industrial process sensor having a sensor component exposed to process fluid detects when the sensor performance has been degraded by a sensor coating buildup from the process fluid. A baseline statistical metric, such as standard deviation of the process parameter sensed by the sensor, is determined during an initial operating period when the sensor component is clean. During continued operation of the sensor, the statistical metric is continually updated and monitored. An alarm output indicating that sensor coating has degraded sensor performance is produced when the current value of the statistical metric varies from the baseline value by an amount indicating degraded sensor performance.

20 Claims, 3 Drawing Sheets

INDUSTRIAL PROCESS SENSOR WITH SENSOR COATING DETECTION

CROSS-REFERENCE TO RELATED APPLICATION(S)

The present invention claims benefit to provisional application Ser. No. 60/728,201, filed Oct. 19, 2005.

BACKGROUND OF THE INVENTION

The present invention relates to industrial process sensors and transmitters. In particular, the invention relates to automatic detection of material buildup on a sensor component exposed to process fluid.

Industrial process sensors and transmitters are used to sense various characteristics of fluids flowing through a conduit, or contained within a vessel. The transmitters sense process parameters such as differential pressure, line pressure, temperature, and pH.

Temperature sensors such as thermocouples, resistance temperature detectors or infrared sensors in process applications are usually protected by a metal or ceramic sheath. The sensor electrical leads are isolated from each other and from the metal sheath and metal parts through some kind of isolating material. The assembly consisting of the sensor, sensor electrical leads, sensor sheath, isolating material and installation fittings is called a sensor assembly.

The sensor leads are connected to an electronic circuit that reads the sensor signal and convert it to a temperature reading. This electronic circuit can reside in an input electronic card of a control, monitoring or safety system or in a transmitter. Transmitters are usually installed relatively close to the temperature sensor.

The transmitter converts the sensor signal to a temperature measurement value and transmits the signal to a remote recipient such as a control, monitoring and/or safety system. The temperature value can be transmitted through different types of signals and media. It can be converted into an analog standard value such as 4 to 20 mA or through digital protocols such as HART, Fieldbus, Profibus, DeviceNet, Modbus, Ethernet, etc. The transmitting media can be via wires, fiber optic, infrared or RF.

Temperature sensors used in industrial processes are typically fitted with a primary seal such as a thermowell. Thermowells are used to provide an additional protection to the temperature sensor. Thermowells are closed-end metal or ceramic tubes that protect temperature sensors from process pressure, erosion and corrosion. They also allow for the installing and removal of sensors without having to shut down the process. Many industrial processes involve fluids that cause sensor coating, a buildup of material on the thermowell (or on a temperature sensor that contacts the fluid directly). This sensor coating increases process temperature measurement response time, and affects control performance and plant safety. In some cases, the coating can become so extensive that it causes thermowell or sensor cracks or breakage.

In many industrial plants, the process must be shut down from time-to-time to clean temperature sensors and thermowells. This maintenance must be done on a periodic basis, because it has been difficult to determine the extent of sensor coating without shutting down the process.

Sensor coating problems produced by exposure of sensor components to industrial process fluids affect other types of process sensors as well. Examples of other components subject to sensor coating include pH probes, remote seals for pressure sensing, and vortex shedding flowmeter components.

BRIEF SUMMARY OF THE INVENTION

With the present invention, a degree of coating buildup on a process sensor component can be determined during process operation. The process parameter is sensed during an initial operating period when coating buildup has not yet been significant. Based on measured values of the process parameter during the initial operating period, a baseline statistical metric such as baseline standard deviation of the process parameter, is determined.

By monitoring the statistical metric such as standard deviation of the process parameter during continued operation, and comparing it to the baseline value obtained while the sensor component was clean, an indication of the extent of material buildup on the sensor component can be determined. As material buildup changes sensor performance, there is a change in the statistical metric. An output based upon the change in statistical metric can provide an indication that buildup of the coating has reached a point that maintenance is required.

DETAILED DESCRIPTION

Figure 1:
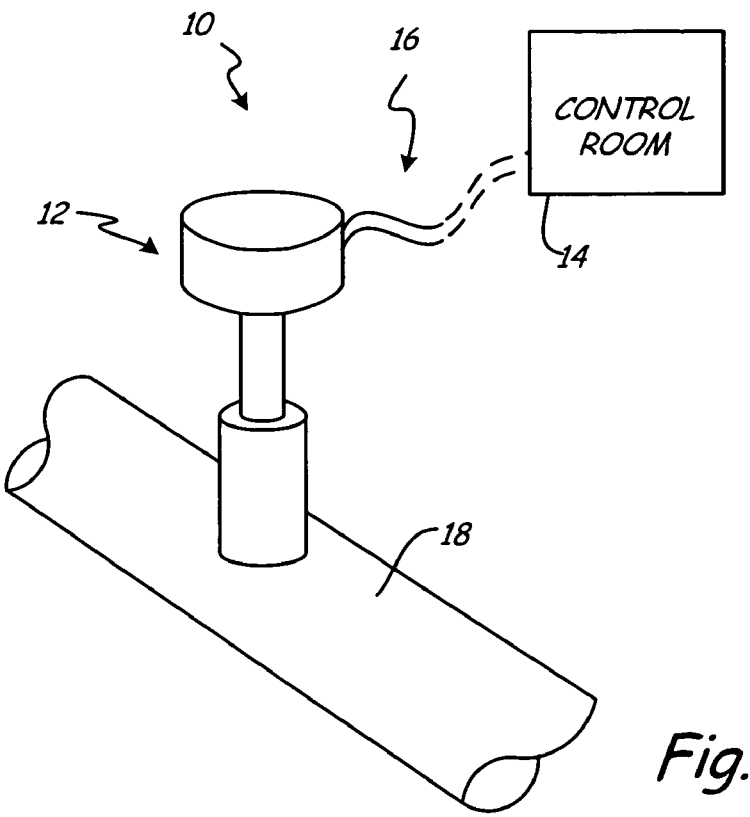
FIG. 1 shows a process control system including a temperature sensor.

FIG. 1 is a diagram illustrating process control system, 10, which includes sensor/transmitter 12 and control room equipment 14 connected over a transmission loop 16 that can be a two or more wire cable, or a fiber optic cable, or a wireless link. In this embodiment, sensor/transmitter 12 measures temperature. Sensor/transmitter 12 is mounted on process piping 18, and provides an output over loop 16 representing measured temperature of process fluid in piping 18. Sensor/transmitter 12 may be a temperature transmitter, may be a sensing device that includes transmitter electronics located within a sensor housing, or may be a sensing device that communicates with control room equipment 14 directly or through a separate transmitter.

Sensor/transmitter 12 transmits temperature information to control room equipment 14 in either analog or digital form. For example, sensor/transmitter 12 may transmit an analog signal representative of measured temperature by controlling the loop current flowing in loop 16 between 4 and 20 milliamps. In addition, sensor/transmitter 12 may transmit to control room 14 digital information related to measured temperature, to a measured secondary process parameter, or to diagnostic data. Transmission of digital information over loop 16 can, for example, be transmitted using the Highway Addressable Remote Transducer (HART) protocol. Alternatively, temperature information, as well as secondary measurements and diagnostic information can be transmitted by sensor/transmitter 12 to control room 14 using an all digital protocol such as Foundation Fieldbus, Profibus, Modbus, etc. Alternatively, the loop may employ various wireless techniques.

Figure 2A:
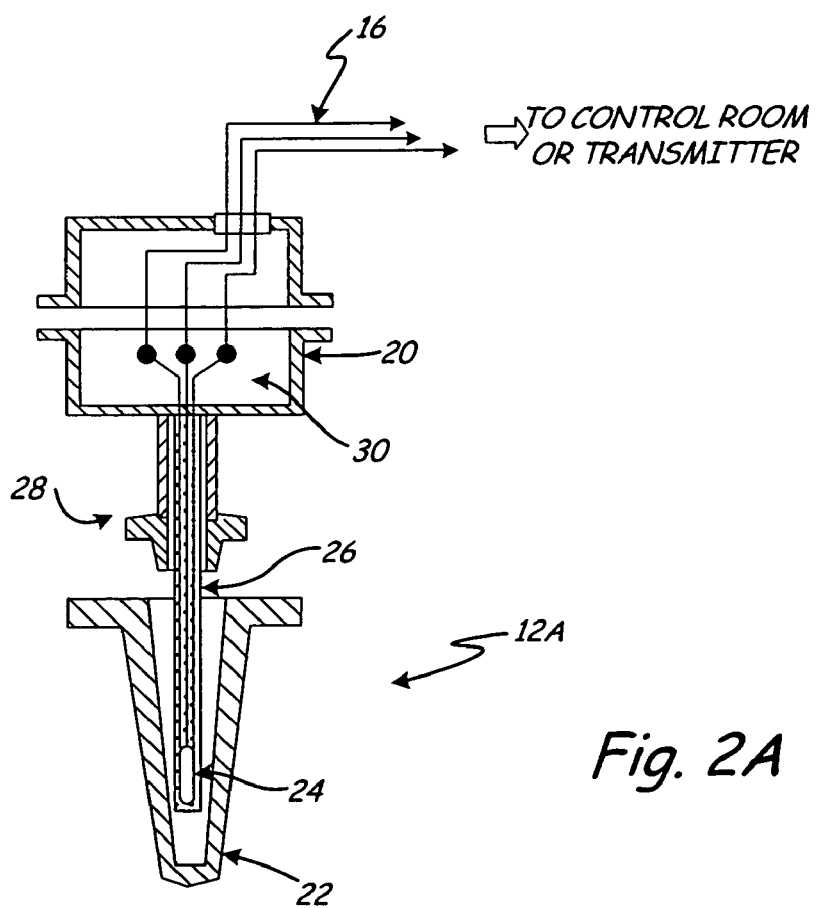
FIGS. 2A, 2B, and 2C are exploded views of embodiments of a temperature sensor/transmitter.
Figure 2B:
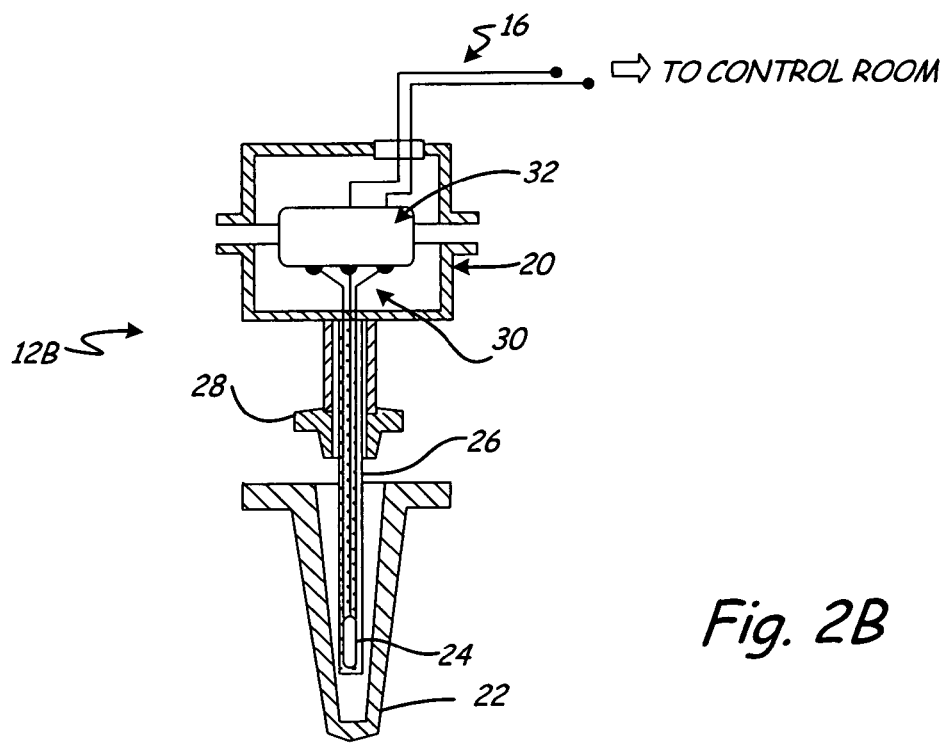
Figure 2C:
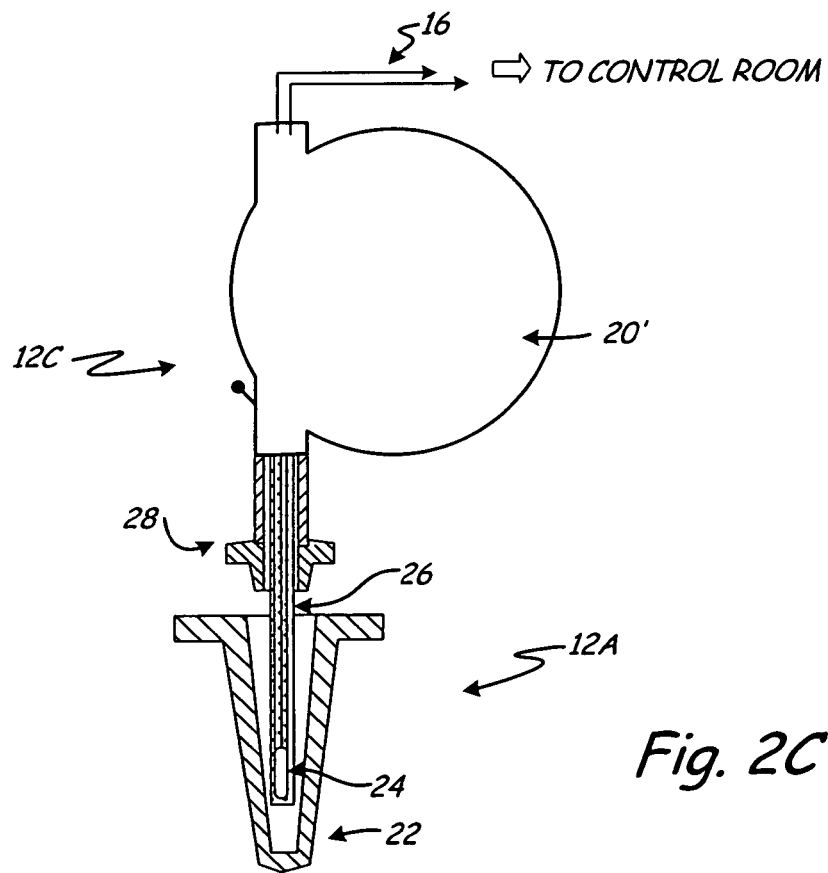

FIGS. 2A-2C show exploded views of three different sensor/transmitter configurations 12A-12C, respectively.

In FIG. 2A, sensor/transmitter 12A does not include transmitter circuitry, and communicates over loop 16 with control room equipment 14 either directly or through a separate transmitter. Sensor/transmitter 12A includes sensor housing 20, thermowell 22, temperature sensor 24, sensor assembly 26, fitting 28, and sensor leads 30 (which are connected to loop 16).

FIG. 2B shows sensor/transmitter 12B, which is similar to sensor 12A, but also includes internal transmitter 32.

FIG. 2C shows sensor/transmitter 12C, which is similar to sensor/transmitter 12B. Instead of sensor housing 20, sensor/transmitter 12C includes transmitter housing 20'.

Temperature sensor 24 may be, for example, a 2-wire, 3-wire, or 4-wire resistance temperature device (RTD) sensor or a thermocouple. An RTD sensor exhibits a change in resistance as a function of temperature, while a thermocouple exhibits a change in voltage as a function of sensor temperature.

Fitting 28 is a metal tube having threaded connections at each end to connect housing 20 or 20' and thermowell 22. Fitting 28 surrounds the upper portions of sensor assembly 26 and provides a sealed passage from housing 20, 20' to the upper end of thermowell 22.

Thermowell 22 provides a fluid tight seal tight that separates sensor assembly 26 and the interior of fitting 28 and housing 20 or 20', from the process fluid. Thermowell 22 is directly exposed to process fluid. Over time, a material build-up (or sensor coating) caused by exposure to process fluids can cover the outer surface of thermowell 22. This sensor coating can degrade sensor performance, and potentially cause damage to thermowell 22 and temperature sensor 24.

In other embodiments, temperature sensors are directly placed in contact with process fluid, rather then being positioned within a thermowell. Sensor coating is also a problem with sensors that are directly exposed to process fluid, which include not only temperature sensors, but also components of other industrial process sensors, such as pressure, flow, and pH sensors.

Figure 3:
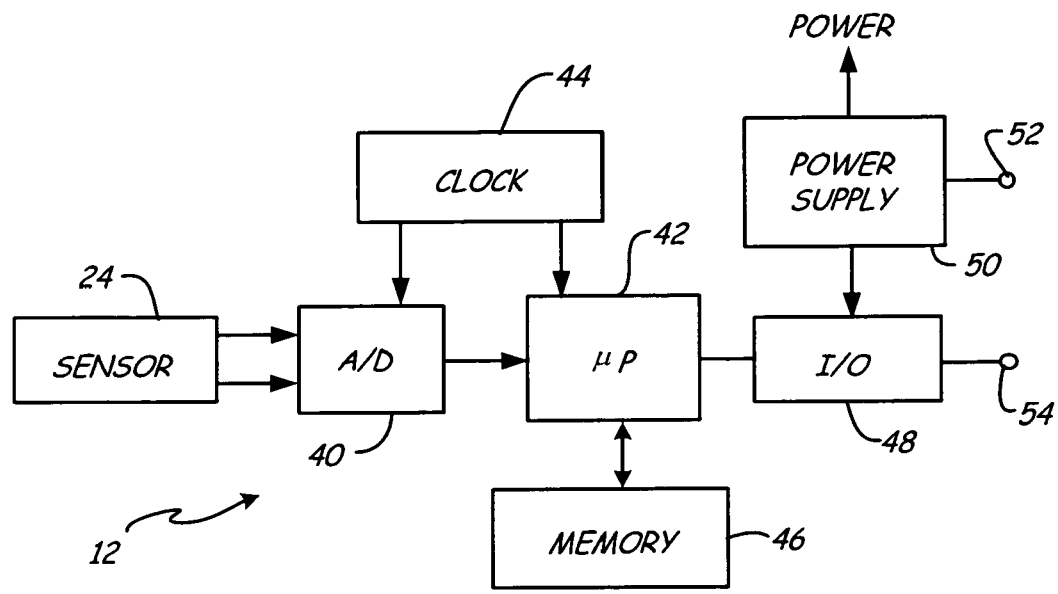
FIG. 3 is a simplified block diagram of the temperature sensor/transmitter.

FIG. 3 is a simplified electrical block diagram of sensor/transmitter 12, and may be representative of any of the embodiments shown in FIGS. 2A-2C. As shown in FIG. 3, sensor/transmitter 12 includes temperature sensor 24, analog-to-digital (A/D) converter 40, microprocessor 42, clock 44, memory 46, input/output (I/O) interface 48, power supply 50, and terminals 52 and 54 (which are connected to loop 16).

Signals from temperature sensor 24, which are a function of the temperature to which sensor 24 is exposed, are converted to digital values by A/D converter 40. The digital values are provided to microprocessor 42 for additional signal processing. Clock 44 provides clock signals necessary for operation of A/D converter 40, as well as microprocessor 42.

Measured temperature values are used by microprocessor 42 to control I/O interface 48 in order to provide an output signal which is representative of the measured temperature. The output provided by I/O interface 48 can be an analog 4-20 mA loop current, or may be a digital signal representative of measured temperature. In addition, I/O interface 48 provides digital communications onto loop 16 based upon the information provided by microprocessor 42. This information includes an indication of the status of sensor coating build-up.

Power for all of the circuitry of sensor/transmitter 12 is derived from wire loop 16. Power supply 50 is connected so that the loop current flows from terminal 52 through power supply 50 and I/O interface 48 to terminal 54. It is appreciated the loop 16 may be wireless, and an alternative power source may be implemented to power the transmitter/sensor.

Microprocessor 42 also stores measured temperature values on a periodic basis in memory 46. These stored temperature measurement values are used by microprocessor 42 to perform statistical analysis in order to evaluate the extent of sensor coating build-up. Using stored configuration data, microprocessor 42 can also calculate an approximate coating thickness.

Figure 4:
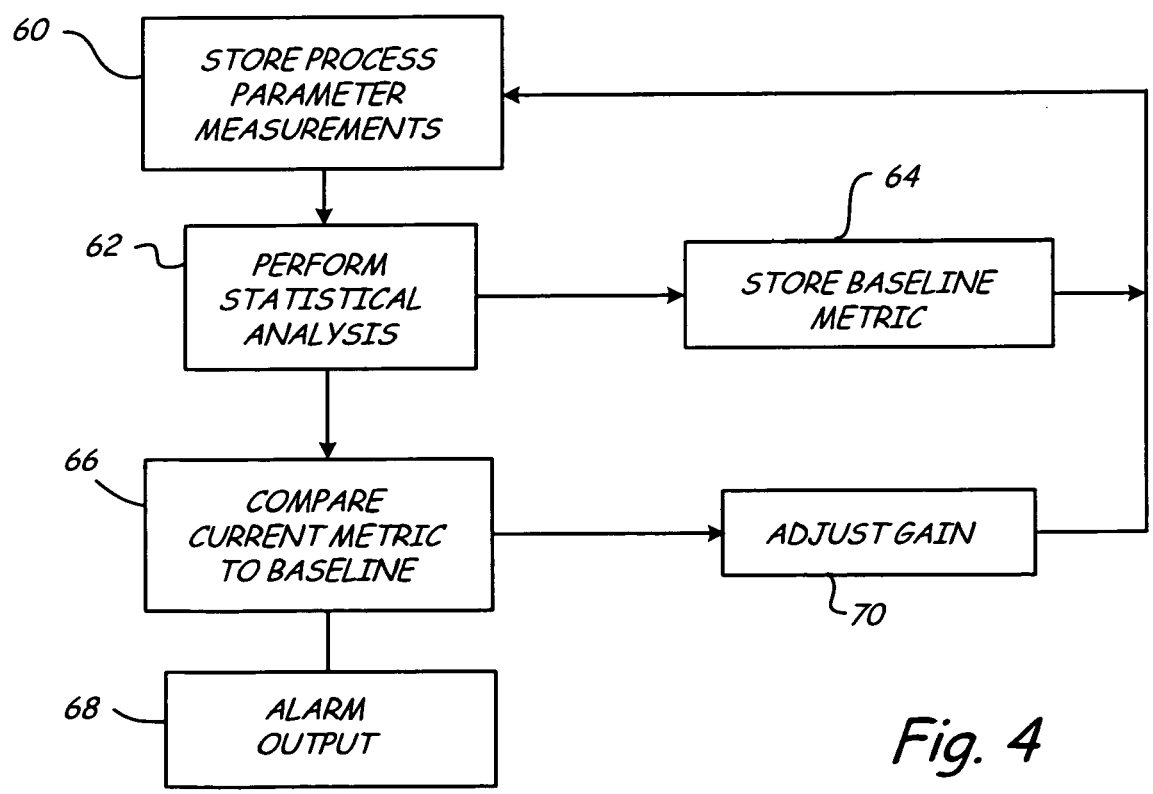
FIG. 4 is a flow chart showing automatic detection of coating build-up.

FIG. 4 illustrates the automatic sensor coating detection feature, as performed by microprocessor 42. During an initial operating period, when thermowell 22 is clean and any material build-up is minimal, microprocessor 42 periodically stores temperature measurement values in memory 46. (Step 60).

Using the stored values from the initial operating period, microprocessor 42 performs a statistical analysis of the measurement data. (Step 62). From this statistical analysis, at least one baseline statistical metric is derived, and is stored for later use (Step 64). The statistical metric must be one that changes with sensor coating build-up, so that periodic comparison of the metric derived from later-gathered measurement data can be used to determine how sensor performance has changed with respect to the baseline metric value.

One example of a statistical metric that can be used for detecting material build-up is standard deviation of the measured parameter. A baseline standard deviation of measured temperature when the sensing component (for example, thermowell 22) is clean, can be compared to standard deviation during subsequent operation, to give very good indication of the extent of sensor coating material build-up. As material build-up increases, the temperature measurement time constant increases, and as a result there is a change in the standard deviation for a given process condition.

During the period subsequent to the initial operating period, microprocessor 42 continues to store measurement values (Step 60) and perform the statistical analysis (Step 62). Microprocessor 42 compares the results to the baseline value. (Step 66). When the current standard deviation (or other statistical metric of the process parameter) has changed from the baseline value to an extent that indicates unacceptable material build-up, microprocessor 42 provides an alarm output through I/O interface 48 to control room equipment 14. (Step 68).

In addition, the standard deviation can also be used to modify process gain, in order to compensate for the effects of sensor coating. (Step 70). When sensor coating is present, the control loop becomes more sluggish. When a change in standard deviation indicates an increase in sensor coating, the change can be used to increase gain in sensor/transmitter 12. This may extend the time between required cleaning of the sensor component.

With the automatic sensor coating detection feature, maintenance to clean up or replace sensor components due to sensor coating build-up can be performed as needed. Unnecessary shut downs of processes simply to check on the status of sensor coating build-up can be avoided.

Although the sensor coating detection feature has been described in the context of a temperature sensor or transmitter, it is also applicable to other types of sensors and transmitters, including pressure, flow, and pH sensors and transmitters. Similarly, although communication has been described over a two-wire or three-wire loop, other configurations using additional wires, or using wireless communication, also can take advantage of the automatic sensor coating detection feature.

Although the present invention has been described with reference to preferred embodiments, workers skilled in the art will recognize that changes may be made in form and detail without departing from the spirit and scope of the invention.

The invention claimed is:

1. A method of detecting coating of a sensor component exposed to a process fluid; the method comprising:
    sensing a process parameter during an initial period with the sensor component exposed to a process fluid;
    determining a baseline value of a statistical metric based on the process parameter during the initial period;
    sensing the process parameter subsequent to the initial period;
    determining a current value of the statistical metric based on the process parameter sensed subsequent to the initial period; and
    providing an output indicative of coating of the sensor component as a function of the current value and the baseline value.

2. The method of claim 1, wherein the output is provided when the current value differs from the baseline value by an amount indicative of degraded sensor performance.

3. The method of claim 1, wherein the statistical metric is a standard deviation of the sensed process parameter.

4. The method of claim 3, wherein the process parameter is temperature.

5. The method of claim 1, wherein the output provides an indication of an extent of coating build-up.

6. The method of claim 1, and further comprising using configuration data to calculate a coating thickness.

7. The method of claim 1, wherein the sensor component comprises one of a temperature sensor, a thermowell, a pH sensor, remote pressure sensor seals, and a vortex shedding flowmeter component.

8. A method of detecting coating of a sensor component exposed to a process fluid, the method comprising:
    sensing a process parameter;
    providing a measurement value as a function of the process parameter sensed;
    performing a statistical analysis of the measurement value to derive a metric that is a function of sensor coating; and
    providing a diagnostic output indicative of sensor coating based on the metric.

9. The method of claim 8, wherein the metric comprises a standard deviation of the measurement value.

10. The method of claim 8, wherein providing a diagnostic output comprises:
    comparing a current derived metric to a baseline metric; and
    producing the diagnostic output if the current derived metric differs from the baseline metric by an amount indicative of sensor coating.

11. The method of claim 8, wherein the process parameter is one of temperature, pH, pressure and flow.

12. Apparatus for use in a process control system, the apparatus comprising:
    a sensor for sensing a process parameter of a process fluid, the sensor including a sensor component that contacts the process fluid;
    measurement circuitry connected to the sensor for producing measurement values based upon the process parameter sensed;
    I/O circuitry for providing an output based on the measurement values; and
    diagnostic circuitry for detecting material build-up on the sensor component based upon a statistical analysis of the measurement values.

13. The apparatus of claim 12, wherein the diagnostic circuitry compares values of a statistical metric produced by measurements during different time periods to detect material build-up.

14. The apparatus of claim 13, wherein the diagnostic circuitry compares a current value of the metric to a baseline value of the metric, representing sensor performance during a time of minimal material build-up.

15. The apparatus of claim 14, wherein the diagnostic circuitry causes the I/O circuitry to produce a diagnostic output when the current value of the metric differs from the baseline value by an amount indicative of material build-up.

16. The apparatus of claim 13, wherein the statistical metric comprises a standard deviation of the measurement values.

17. The apparatus of claim 12, wherein the sensor component comprises one of a temperature sensor, a thermowell, a pH sensor, a remote seal for a pressure sensor, and a vortex shedding flowmeter component.

18. The apparatus of claim 12, wherein the measurement circuitry comprises an analog-to-digital converter, and the diagnostic circuitry comprises a microprocessor.

19. The apparatus of claim 12, wherein the diagnostic circuitry causes the I/O circuitry to produce a diagnostic output when material build-up is detected.

20. The apparatus of claim 12, wherein the diagnostic circuitry comprises a memory for storing the measurement values and a digital processor for performing a statistical analysis based on the stored measurement values.

* * * * *